United States Patent [19]

Conti

[11] Patent Number: 4,567,676
[45] Date of Patent: Feb. 4, 1986

[54] DOUBLE-JET, HOT-AIR GENERATOR FOR SPECTACLE FRAMES

[76] Inventor: Gianfranco Conti, Via Compagnoni, 20 Milano, Italy

[21] Appl. No.: 521,162

[22] Filed: Aug. 5, 1983

[30] Foreign Application Priority Data

Oct. 29, 1982 [IT] Italy ............................. 24000 A/82

[51] Int. Cl.⁴ .............................................. F26B 19/00
[52] U.S. Cl. ...................................... 34/202; 432/225;
432/226; 432/231; 219/367; 219/368; 219/370; 219/373
[58] Field of Search ................... 34/202; 219/366, 367, 219/368, 369, 370, 373; 432/225, 226, 227, 231

[56] References Cited

U.S. PATENT DOCUMENTS

| 2,789,200 | 4/1957 | Ebert | 219/375 |
| 3,223,313 | 12/1965 | Kinsworthy | 219/369 |
| 3,305,164 | 2/1967 | Laing | 219/368 |
| 3,637,982 | 1/1972 | Reaves | 34/202 |
| 3,711,957 | 1/1973 | Carver | 219/370 |
| 3,816,065 | 6/1974 | Marietta | 432/226 |
| 3,932,114 | 1/1976 | Ebert | 34/1 |
| 4,007,370 | 2/1977 | Ebert | 432/225 |
| 4,037,079 | 7/1977 | Armbruster | 219/366 |
| 4,205,221 | 5/1980 | Meyer | 219/373 |
| 4,426,571 | 1/1984 | Beck | 219/367 |

Primary Examiner—Larry I. Schwartz
Assistant Examiner—David W. Westphal
Attorney, Agent, or Firm—Michael J. Striker

[57] ABSTRACT

A hot-air generator to facilitate execution of work on plastic spectacle frames, having two axial, parallel and opposing hot-air outlets.

3 Claims, 4 Drawing Figures

DOUBLE-JET, HOT-AIR GENERATOR FOR SPECTACLE FRAMES

BACKGROUND OF THE INVENTION

Well known is the equipment used in optical work for heating the plastic frames of spectacles to soften them and make it possible to shape them to the desired form both temporarily or permanently.

This is done to adapt the frames to fit the lenses and suit the face when the lenses are first mounted or when the spectacles need repairs.

A draught of air, passing through electric elements, heats the frames when it emerges from an outlet meeting one side of the frames to be softened.

This means that the operator must repeatedly turn the frames over in relation to the source of heat both to speed up the work and to warm the frames evenly.

The necessity to repeat this action clearly makes the work slower and more complex; further, it proves almost impossible to keep the frames uniformly and continuously heated.

The above invention eliminates the above drawbacks and provides considerable advantages as well, as will be described below.

SUMMARY OF THE INVENTION

Subject of the invention is a hot-air generator for the process of assembling plastic spectacle frames, at the working surface of which there are two hot-air outlets, in a pair, perpendicular to the working surface, parallel and counterposed to each other. A chamber is thus created in which to place the part of the frames to be treated, such part receiving warm air simultaneously on one side and on the other and especially on the front and on the back.

This hot-air generator employs a cylindrical fan with tangential blades and electric elements placed parallel to the blades of the fan.

The work surface area, lying between the opposing hot air outlets, is formed of a grating placed above the heating elements and parallel to them thus giving rise to a third hot air outlet between the first two opposing outlets, and perpendicular to them.

The shape of the air inlet aperture is practically rectangular and this aperture lies parallel to the fan. The cylindrical fan is housed in a cylindrical chamber that carries the air, sucked in through the rectangular inlet lying parallel to the fan, into a parallelepiped shaped chamber housing the electric elements at the top of which chamber there is a long rectangular aperture it too being parallel to the fan and having in its central part a grating which forms the work surface.

The two paired and opposing outlets of hot air consist of two air conveyors placed at the two ends of the rectangular outlet aperture for hot air lying over the electric elements, the base of each conveyor being open above the electric elements and parallel to them for air entry, and each conveyor having an outlet aperture perpendicular to such base.

By means of the rectangular aperture for entry of cold air, of the cylindrical fan parallel to the first aperture, of the electric elements parallel to the fan and of the rectangular hot air outlet parallel to the elements, a flow of hot air is produced, having a rectangular cross section, directed towards the work surface, and this flow passing through the conveyors divides into two streams which change direction, almost by 90 degrees, the one turning to meet the other in the area where the spectacle frames are placed for treatment.

The two conveyors referred to above substantially consist of a box-shaped body comprising two parallel sides the width between them being that of the rectangular aperture of the parallelepiped chamber containing the electric elements, and of a cover formed by a back wall sloped and joining a curved wall at the top.

This cover is substantially opposed to the flow of air coming from the electric elements, and has the effect of changing its direction by almost 90 degrees.

Suitable and well-known devices are provided for regulating the speed of fan rotation, the quantity of heat given off by the electric elements and the temperature of the hot air. Screened areas exist on the grating above the electric elements to prevent, if necessary, direct heat from the elements reaching the spectacles placed in the work space on the grating itself.

The characteristics and the purposes of the invention will become even clearer by the following example of its execution accompanied by diagrammatic drawings.

DETAILED DESCRIPTION OF THE PREFERRED EMBODIMENTS

Figure 1:
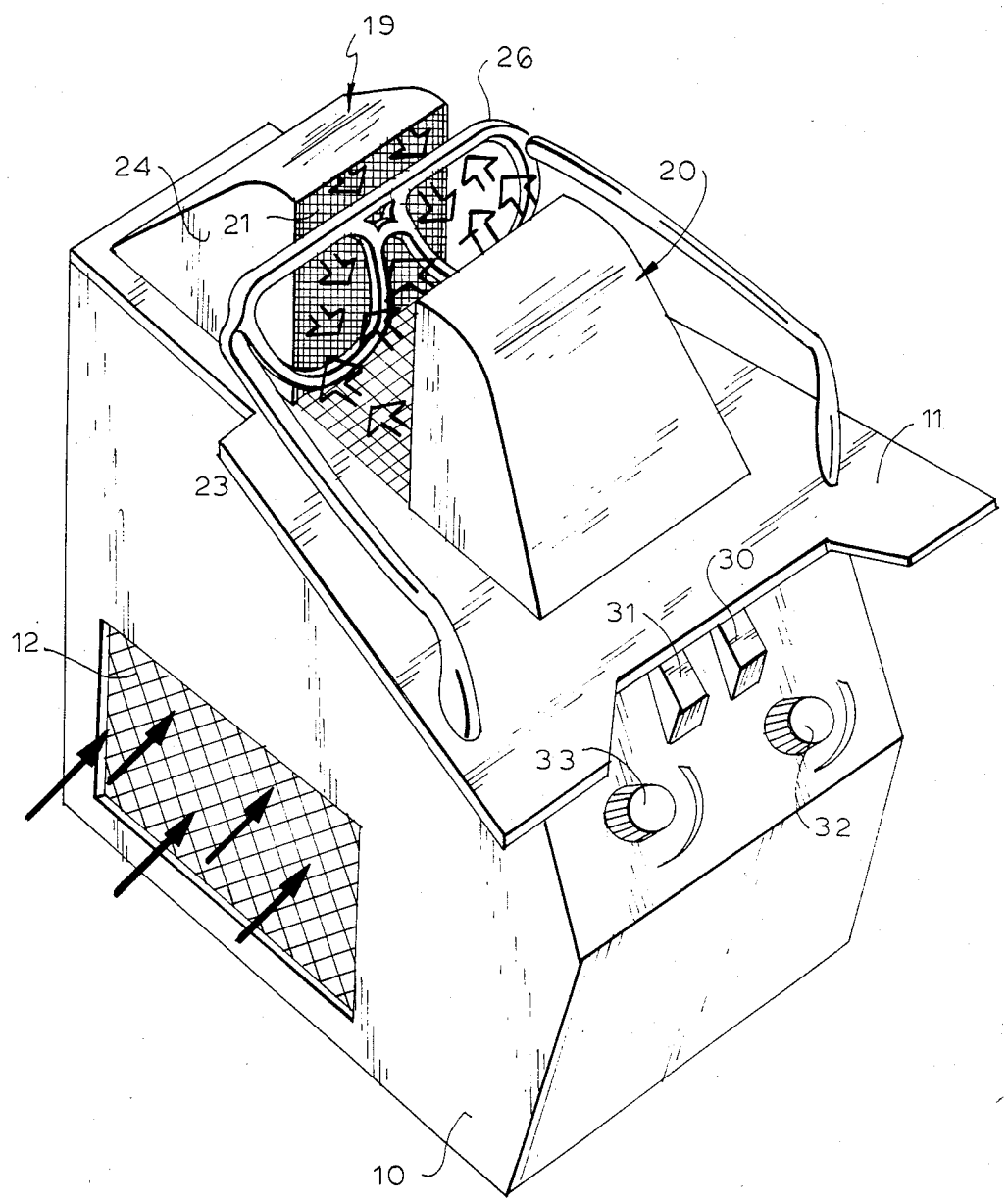
FIG. 1: the equipment seen in perspective from outside
Figure 2:
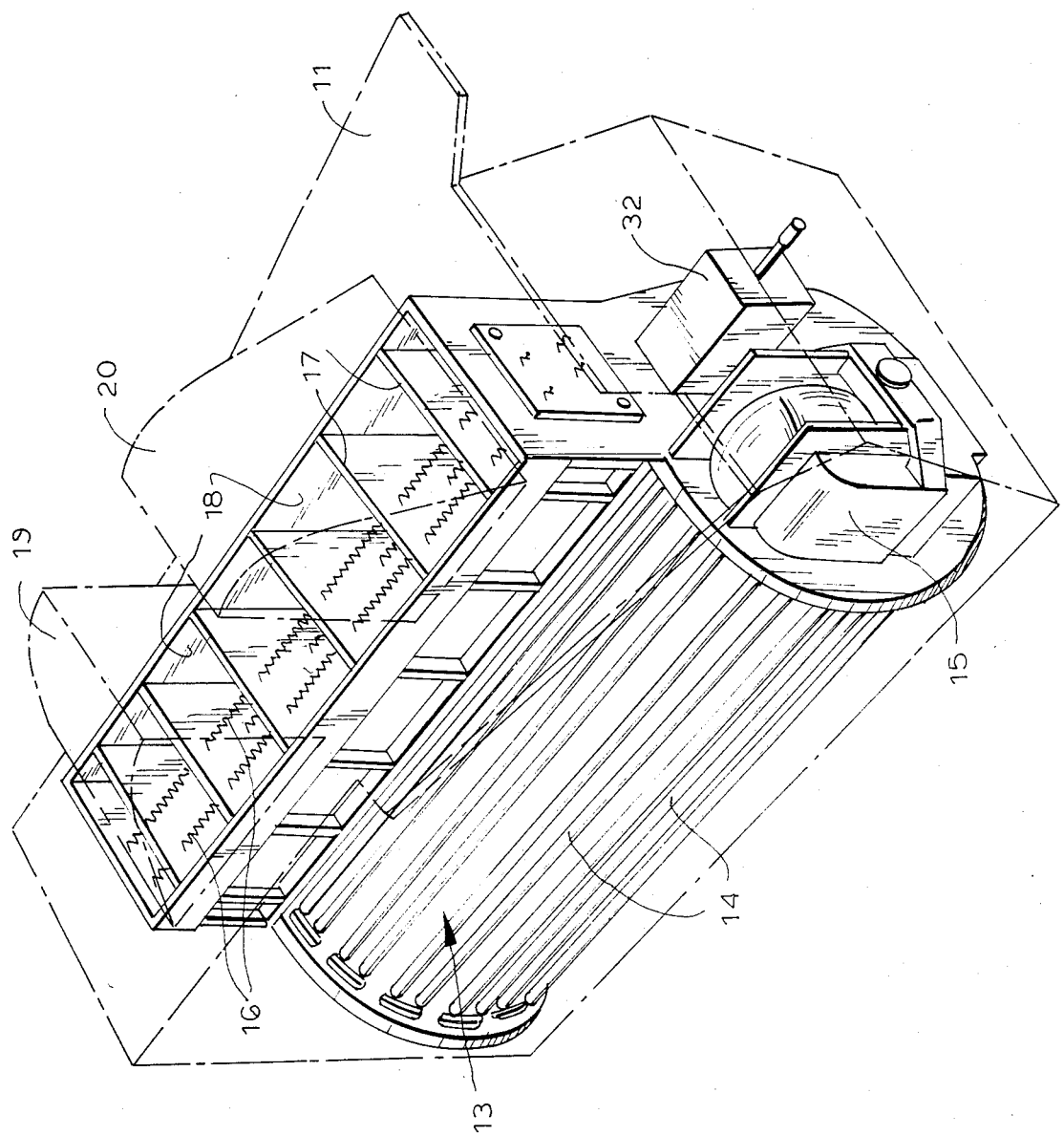
FIG. 2: the equipment seen in perspective from inside
Figure 3:
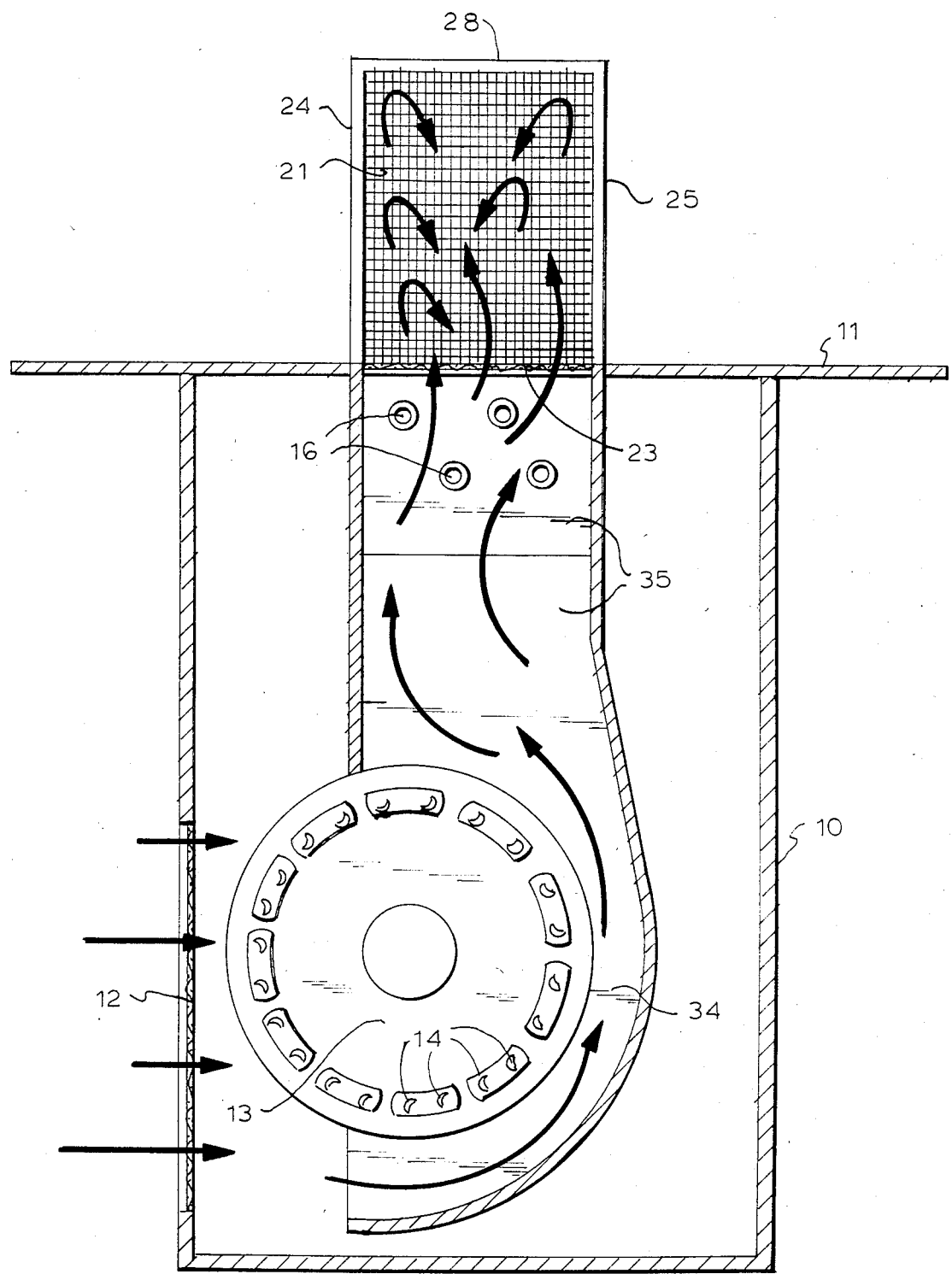
FIG. 3: transversal cross section

The equipment includes the outer casing (10), the working surface (11) on which the spectacles stand, the aperture (12) for entry of air, the fan (13) with tangential blades (14) turned by the electric motor (15), a certain number of electric elements (16), supported by insulating diaphragms (17) and placed parallel to the blades for their entire length.

A rectangular aperture (18) for air outflow, about as long as the elements themselves, is provided on the work surface.

The two conveyors (19) and (20) are situated at the two ends of such aperture with their vertical and opposing outlets (21) and (22), provided with gratings that convey the inflowing air, divided into two streams one directed towards the other.

Between outlets (21) and (22) lies the horizontal grating (23) placed over the central part of the heating elements. The width of the conveyors and the size of the work surface (11) are sufficient to allow the spectacles (26) to be placed for treatment as shown in FIG. 1 and diagrammatically in FIG. 4.

Each conveyor (19) and (20) is formed of a box-shaped body with a wide open base coinciding with the ends of the aperture (18) for the flow of hot air, and comprising the outlets (21) and (22) for hot air, perpendicular to the base, two parallel sides (24) and (25) substantially coinciding with the side edges of the oblong aperture (18), and back wall (27), sloped, and an upper roof (28) joined to the back by the piece of curved roof (29).

The rocker switch (30) starts the electric motor causing cold air to be sucked in.

The rocker switch (31) turns on the electric elements.

The rheostat (32) enables fan speed to be increased or reduced.

The fuse (33) protects the circuits.

As clearly shown in the figures, the cylindrical fan (13) is housed in the cylindrical chamber (34) which, as it approaches the elements, becomes a parallelepiped (35) until it joins the rectangular opening (18) above these elements.

Mode of operation

Cold air is sucked in through the aperture (12) with its grating, and heats up as it passes through the electric elements.

Air delivery, its force and temperature, can all be regulated at will.

Figure 4:
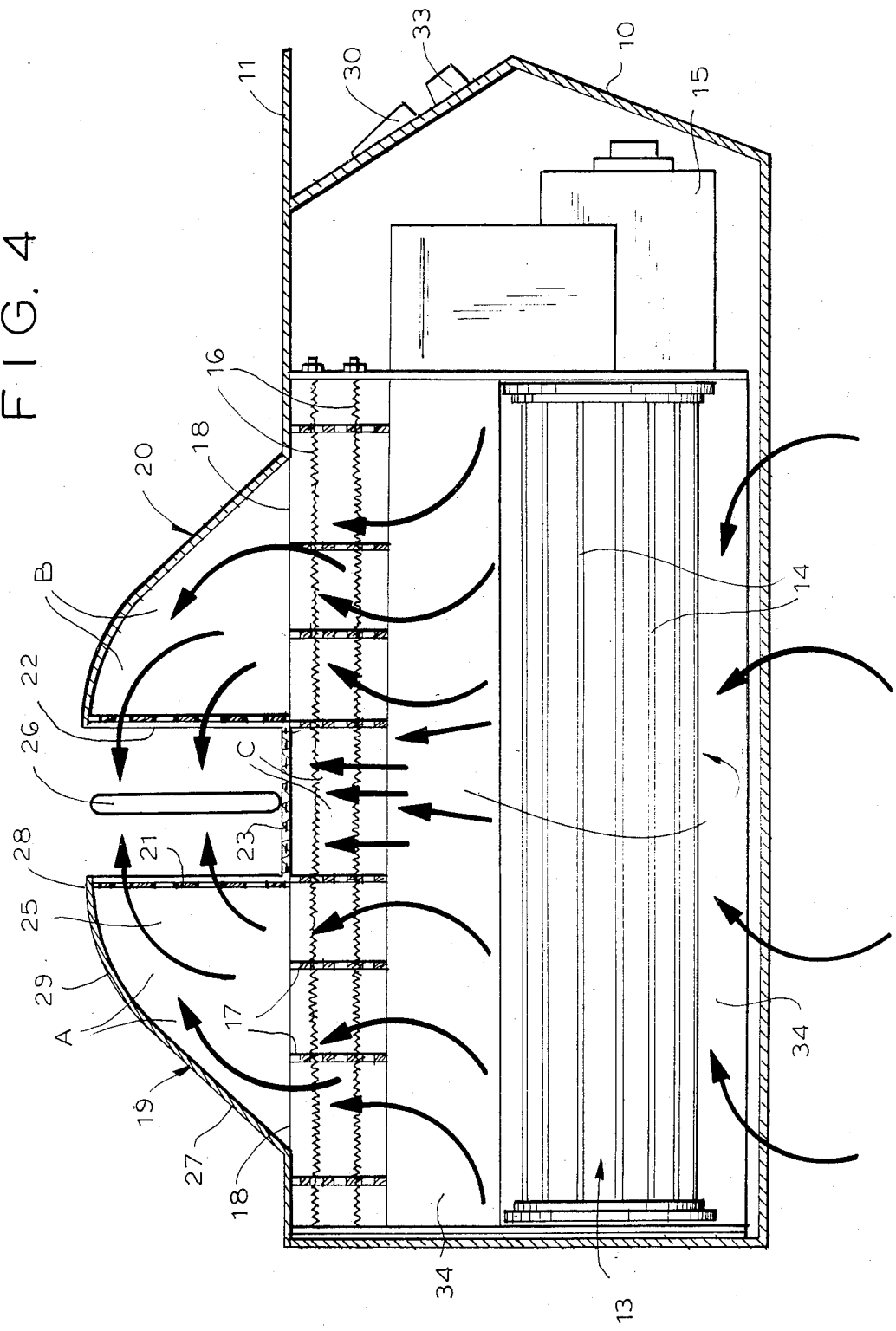
FIG. 4: longitudinal cross section

The heated air comes out from the opening (18) above the elements and, due to the effect of the conveyors, divides into two streams one directed towards the other as shown by the arrows A and B in FIG. 4, while a third stream, coming up from below, flows as shown by the arrow C. As a consequence the spectacles (26), placed between the two conveyors, seen in perspective in FIG. 1 and drawn diagrammatically in FIG. 4, are simultaneously reached by hot air both back and front and from below as well.

Advantages

The spectacle frames are heated uniformly without any need for turning them over as is required with present heating equipment.

Heating itself is also uniform avoiding the risk of setting up harmful stresses in the plastic.

The work can therefore be done much better and more quickly. The spectacles have a longer life and the present liklihood of their getting out of shape, due to internal stresses, is avoided.

As the applications of the invention have been described purely as an example in no way limited to this, it is understood that any equivalent application of the inventive concepts explained and any product executed and/or in operation according to the characteristics of this invention, will be covered by its field of protection.

I claim:

1. An apparatus for heating thermoplastic spectacle frames, comprising:

an outer housing having a substantially oblong side aperture with a longitudinal axis, and a horizontal, substantially oblong upper aperture having a longitudinal axis and being substantially divided into three square coplanar openings, namely a central opening upon which said frames rest and two side openings of substantially equal size;

a cylindrical chamber provided in said housing;

a horizontal, oblong, parallelepiped chamber having an upper side incorporating said upper aperture;

a set of substantially oblong electric heating elements housed in said parallelepiped chamber and having a longitudinal axis;

a cylindrical fan having longitudinal blades and a horizontal axis and being mounted inside said cylindrical chamber so as to draw air in through said side aperture into said parallelepiped chamber so as to pass it through said set of heating elements, and discharge hot air out of said upper aperture, said longitudinal axis of said side aperture, said upper aperture and said set of heating elements being parallel to said horizontal axis of said fan, said upper aperture being of a size and shape practically equal to that of said side aperture so that the discharged hot air forms a stream having a practically constant rectangular cross-section; and means for separating the discharged air into three flows, said means including a pair of arched conveyors, one being located on each of said side openings, each of said conveyors having a practically constant transverse cross-section curved at 90°, and a square exit opening which is opposite, parallel and oriented toward the square opening of the other of said conveyors, so that the discharged air is thereby divided into three flows of substantially constant square cross-section, a central vertical flow leaving said central opening and contacting said frames resting thereon, and two lateral flows which pass through said arched conveyors, make a 90° curve and move horizontal one toward the other while crossing the flow which rises from said central opening so as to heat the frame uniformly on three sides.

2. An apparatus for heating thermoplastic spectacle frames as defined in claim 1, wherein said arched conveyors each comprise a box-shaped body, with an open square base to allow entry of the air flowing from the oblong upper aperture, said body being formed with two parallel sides each having a bottom edge which fits onto a lateral edge of the oblong upper aperture, and a sloping back face having a bottom edge which fits onto a short side of the oblong upper aperture while the remainder of the back face attaches along its side edges to the top edges of the two parallel sides to form a square exit opening which is perpendicular to said square base.

3. An apparatus for heating thermoplastic spectacle frames as defined in claim 1, wherein said set of electric heating elements are mounted below said upper aperture.

* * * * *